July 5, 1966  R. E. BOWLES  3,259,096
THRUSTER APPARATUS FOR CRAFT
Filed March 10, 1964  6 Sheets-Sheet 1

INVENTOR.
RONALD E. BOWLES
BY Hurvitz & Rose

INVENTOR.
ROMALD E. BOWLES

July 5, 1966 R. E. BOWLES 3,259,096
THRUSTER APPARATUS FOR CRAFT
Filed March 10, 1964 6 Sheets-Sheet 6

INVENTOR.
ROMALD E. BOWLES
BY
Hurvitz + Rose

United States Patent Office 3,259,096
Patented July 5, 1966

3,259,096
THRUSTER APPARATUS FOR CRAFT
Romald E. Bowles, Silver Spring, Md., assignor to Bowles Engineering Corporation, Silver Spring, Md., a corporation of Maryland
Filed Mar. 10, 1964, Ser. No. 350,885
14 Claims. (Cl. 114—151)

The present invention relates to force generators or thrusters for mobile vehicles and, more particularly, to a fluid thrust generating mechanism for mobile vehicles employing pure fluid mechanisms for controlling delivery of relatively variable quantities of fluid to various outlet passages to effect a desired net thrust vector.

In the manuvering of barges and ships which must make frequent stops or must operate in confined waterways such as rivers, canals, harbors, etc., it is desirable that one be able to develop a component of thrust in the horizontal direction normal to the major axis of the ship. For this purpose, it has been conventional practice to provide tunnels through the bow of the ship in which is placed a propeller driven by a steam turbine, a diesel engine, or an electric motor through a right angle mechanical drive. In addition, some installations make use of controllable pitch propellers located in these tunnels. A description of the latter type apparatus is contained in a paper entitled "Design Model Testing and Application of Controllable Pitch Bow Thrusters," by Lennart Pehrsson, A. B. Karlstads, Mekaniska Werkstad and Robert G. Mende, Bird-Johnson Company presented at the September 29, 1960 meeting of the New York Metropolitan Section of the Society of Naval Architects and Marine Engineers. More recently, it has been proposed to place a comparable unit at the stern of the vessel being controlled.

In other installations, a fixed pitch propeller is used to suck fluid from below the ship's keel up into a fork wherein part of the flow can be delivered to the port side and part to the starboard side of the ship, in response to butterfly valves placed at the outlets of these flow passages.

In all of these installations, problems appear to arise from the following:

(1) Controllable pitch propellers are costly and have a poor reliability in general.

(2) The moving parts of the butterfly valves (when used) are subject to structural damage due to foreign objects inducted by the system from the surrounding water. Also, these valves are costly in the sizes required, these being as large as 92 inches in diameter. Further, complete or partial blocking of the various passages may result in cavitation of the propeller due to improper loading.

(3) The use of variable speed drives cooperatively with lower cost fixed pitch propellers imposes a further cost restriction on the installation and renders the control network more complex and more expensive.

(4) The concentrated exhaust of these systems create surface waves and hazards for small boats in the vicinity and damage the installations of the piers, locks, etc. adjacent to the vessel due to the high exhaust velocity and its low dispersion characteristics. These concentrated exhaust jets reportedly maintain their identity up to distances as high as a quarter of a mile.

In accordance with the present invention, there is provided an improved system for developing thrusts and moments in the horizontal plane which enable a ship to maneuver in confined waterways and situations; such as rivers, canals, harbors, etc. The overall system includes a control system and thrust generator system having a minimum of moving parts and providing a design of the discharge jet system which minimizes damage and disturbance to adjacent small craft and the boundaries of the waterway.

The thrust generator system comprises an analog pure fluid amplifier of the general type disclosed in U.S. Patent No. 3,024,805 to Billy M. Horton or a boundary layer pure fluid amplifier of the general type disclosed in U.S. Patent No. 3,001,698 to Raymond W. Warren. In these amplifiers, a power nozzle issues a stream of fluid toward at least two outlet passages located downstream of the power nozzle orifice. The region between the power nozzle orifice and the outlet passage is defined as an interaction region, bounded by two sidewalls. The sidewalls, in conjunction with a divider, define the two outlet passages. Control nozzles are let in through the two sidewalls and, in the Horton device, issue streams of fluid against the stream issued by the power nozzle. The ultimate direction of the power stream is determined by the relative momenta of the two control streams and the relative proportions of the fluid directed to the outlet channels are a function of power stream direction.

In the above amplifier, the flow is proportioned between the two outlet channels without the use of moving mechanical parts and flow gains of ten or more are obtainable. As a result, many of the problems of prior art bow thrusters may be overcome. Flapper or butterfly valves may be eliminated or, if butterfly valves are employed, they are located in the passages to the control nozzle and therefore do not affect loading on the propeller. In fact, the apparatus presents a substantially invariable load on the drive system thus minimizing shock, vibration and various other damaging effects associated with variable loads on heavy duty mechanical systems. Also, since the control nozzles are required to handle far less fluid than that required to actually perform steering, the butterfly valves, when located in the control passage, may be considerably smaller than prior art valves. As a result of their small size, the valves may be made quite strong and may be fabricated from or plated with a non-corrosive material so as to greatly reduce probability of damage while still reducing the cost of the valves required by the prior art devices. Further reductions in size of the valves may be achieved by staging amplifiers; the valves controlling the first, and therefore smallest, amplifier of the staged device. Since in the fluid amplifier, the control streams combine with the power streams, there is no loss of fluid due to the use of some of the fluid of the system for control purposes.

In another form of the invention, the pressurized fluid, for instance, air or water, employed to control the deflection of the main stream in the amplifier, is piped to the unit from the control bridge or other control location. The fluid supplied to each control nozzle is adjusted at the control location by a steering device and, in this case, no flapper or butterfly valves are required at the bow thruster.

Another advantage accruing from the use of pure fluid amplifiers is the ability to employ completely vertical systems and directly couple the propeller to its source of power without the use of gearing. By a vertical system is meant one in which the intake port is in the bottom of the vessel and the outlet ports or passages are located vertically above the intake port so that curved passages are not required except for distribution to one or the other side of the vessel. Where a flapper valve was employed in the prior art to open one channel while closing the other, the motor shaft could not readily be brought to the propeller from a location downstream thereof. In consequence, if water is to be inducted through an opening in the bottom of the ship, the prior art system must include a horizontal channel in which to locate the propeller so that access may be had to the upstream end of the propeller. A completely vertical arrangement may be used only if the drive system employs gears so that the drive shaft may be brought down parallel to the propeller axis and coupled to the upstream end of the propeller by gearing and cross shafts. In the present invention, a completely vertical and gearless system may be employed since the motor shaft may be brought through the interaction region of the fluid amplifier without producing appreciable effects on the operation of the amplifier.

In accordance with a further feature of the invention, the effects of high exhaust velocities on adjacent vessels and installations are minimized by appropriate contouring of the output orfices. By providing an exhaust port which is an elongated rectangle, the energy of the high velocity fluid may be dissipated in a relatively short distance (one-quarter to one-fifth of the distance of a square orifice with the same area) without reducing the total thrust provided.

It is an object of the present invention to provide a bow and/or stern thruster having output ports which issue water jets shaped such that the energy of the jets is rapidly dissipated in the surrounding water.

Another object of the present invention is to provide bow and/or stern thrusters for water craft in which the output orifices of the thrusters are positioned so as to issue water jets inclined downwardly and shaped so that the energy of the jets is rapidly dissipated thereby materially lessening the possibility of damaging nearby objects without lessening the thrust available for steering.

Yet another object of the present invention is to provide bow, stern and/or fore and aft thrusters for water craft employing pure fluid amplifiers as a means of controlling the direction of discharge of fluid with a minimum of moving parts subjected to the fluid environment or alternatively with no moving parts employed for control being subject to the fluid environment.

It is still another object of the present invention to provide bow, stern and/or fore and aft thrusters for water craft employing pure fluid amplifiers in which remotely developed pneumatic control signals are employed for control of water flows differentially to at least two output passages which issue fluid into the surrounding water in opposite senses for steering control.

It is another object of the present invention to provide a vertically arranged bow and/or stern thruster employing direct drive of the propeller.

Yet another object of the present invention is to provide a vertically arranged bow and/or stern thruster for water craft steering employing a pure fluid amplifier having a propeller for providing flow in the power nozzle of the amplifier and in which a propeller drive shaft may be passed through the amplifier to provide direct connection between the propeller and its source of power.

The above and still further objects, features and advantages of the present invention will become apparent upon consideration of the following detailed description of several specific embodiments thereof, especially when taken in conjunction with the accompanying drawings, wherein.

Figure 1:
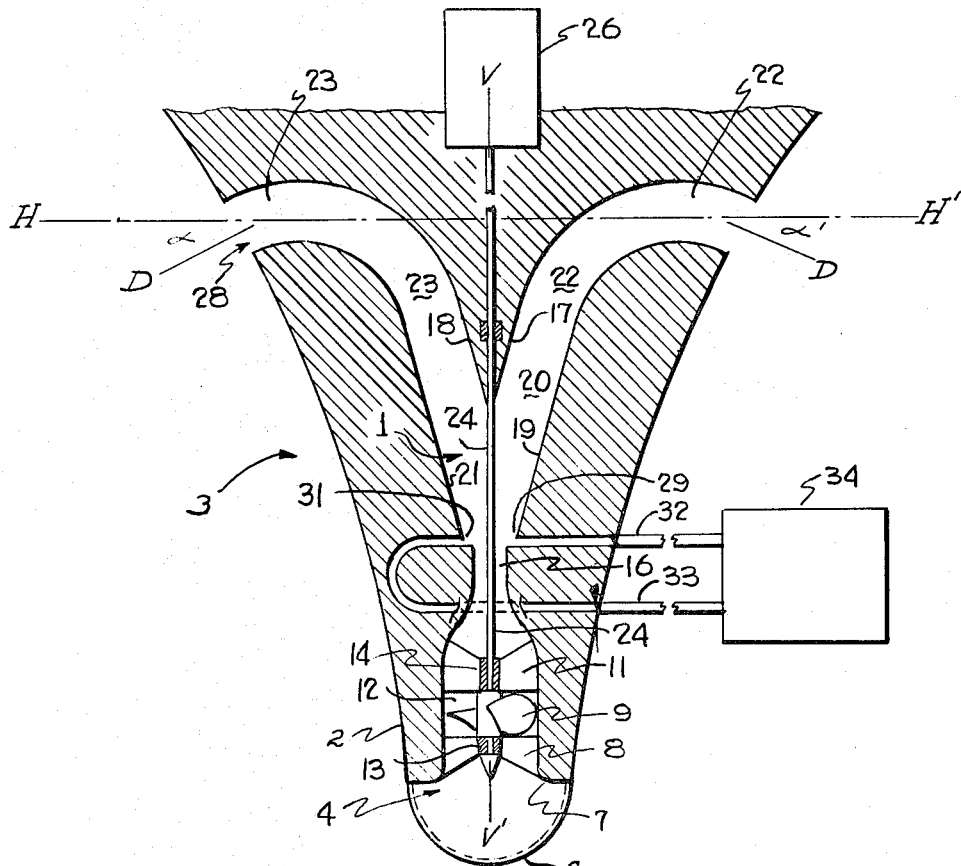
FIGURE 1 is a cross-sectional view of the first embodiment of the present invention located in a hull of a vessel.

Referring now specifically to FIGURE 1 of the accompanying drawings, there is illustrated in cross-section a bow thruster of the type provided by one embodiment of the present invention. It should be noted that, although the device is referred to and discussed as a bow thruster, if it is desired to provide the stern thruster alone or in conjunction with the bow thruster, a substantially identical installation may be provided at the stern. Everything that is said herein about a bow thruster is of equal applicability to a stern thruster.

The bow thruster, which is generally designated by the reference numeral 1, is installed in the hull 2 of a vessel, generally designated by the reference numeral 3. The hull is illustrated as floating in water, the level of the water being designated by the horizontal line HH′. Water is inducted into the bow thruster 1 through an opening 4 located in the bottom of the hull. A grating 6 is located in the opening 4 to prevent floating masses and debris from entering the system. The water flowing through the opening 4 flows over an intake, faired surface 7, and past a first set of flow straighteners 8, which are basically a plurality of straight, axially elongated, radially extending vanes. The water then flows over a propeller 9 and thence over a second set of flow straighteners 11. The flow straighteners 8 and 11 are secured in a passage generally designated by the reference numeral 12 and have located at their centers hubs for supporting bearings 13 and 14 for the drive shaft 24 of the propeller 9. The passage 12 has a reduced transverse dimension to provide a power nozzle 16. Located downstream of the power nozzle 16 are a pair of walls 17 and 18 which join to provide a sharp apex 20 coaxial with the center of the passage 12 and directed toward the power nozzle 16. Downstream of the power nozzle 16, the passage 12 flares outwardly, being confined between outwardly diverging walls 19 and 21. The walls 17 and 19 form a right output passage 22 and the walls 18 and 21 form a left output passage 23. The shaft 24 which provides rotation of the propeller 9, passes axially through the apparatus; that is, pierces the apex 20 at the junction of the walls 17 and 18, passes centrally through the nozzle 16 and the passage 12 on to the propeller 9. The shaft 24 may be connected directly to the output shaft of a source of rotational energy 26, so that there is a direct coupling between the source of energy 26 and the propeller 9. As will be described subsequently, this placement of the shaft 24 through the center of the device does not in any way affect the operation of the apparatus.

Under normal conditions, the flow inducted into the system by the propeller 9 divides equally between the output passages 22 and 23 and exits through ports 27 and 28 formed in the starboard and port sides of the hull, respectively. It will be noted that the passages 22 and 23, where they exit from the sides of the hull, are inclined downwardly, preferably at angles of 5° to 10° so that the jet stream issuing from the ports passes under adjacent vessels and does not appreciably affect their course or stability.

In order to control proportioning of the flow between the outlet passages 22 and 23, there are provided a pair of control nozzles 29 and 31 located at the port and starboard sides of the power nozzle 16 just downstream therefrom. Fluid, either air or water, is supplied to the nozzles 29 and 31 via passages 32 and 33 which are supplied with fluid from a suitable control station 34 to be described in detail subsequently. When it is desired to cause the ship to turn toward the port side, fluid is injected through the nozzle 31 either in the absence of fluid from the nozzle 29 or in greater proportion than fluid from the nozzle 29, thereby causing a greater proportion of the fluid to pass out through the outlet passage 22 than passes through the outlet passage 23. In consequence, a net thrust is developed in the port direction and the vessel moves in that direction. If a stern thruster is employed concurrently with the bow thruster, opposite controls would be applied so that the stern of the vessel moves toward the starboard and a turning moment about the center of the ship is developed.

It will be noted that the only moving mechanical parts employed in the system which are subject to the fluid environment are the propeller 9 and the shaft 24. The propeller may be fabricated from or plated with a suitable material which is resistant to corrosion by the usual salt-water or other hard-water environment normally encountered in navigable waters. The propeller is a fixed-pitch propeller and is therefore relatively inexpensive. Variations in drive speed are not necessary in the type of apparatus employed but, if variable speeds are desired, the source of motive power 26 may be regulated. Since a direct drive is provided between the power source and the propeller 9, there is no fear of excessive gear wear which is normally encountered with variable speed drives such as are normally employed with fixed propeller structures. As previously indicated, the shaft 24 does not appreciably affect the operation of the fluid amplifier. The diameter of the shaft is quite small when one considers the overall dimensions of the thruster required to produce adequate transverse thrust in the conventional ship. Any flow perturbations introduced by the presence of the shaft are local in nature and affect a very small proportion of the total amount of fluid flowing through the system.

As previously indicated, it is desired in accordance with the present invention to reduce the effect of the extremely large jets being issued through the ports 27 and 28 on surrounding vessels and installations when in harbor, in canals, narrow rivers, etc. This is accomplished in accordance with the present invention by contouring the output ports 27 and 28 so as to maximize the rate of dissipation of energy in the jet once it has entered the surrounding water without appreciably affecting the total thrust available.

Figure 2:
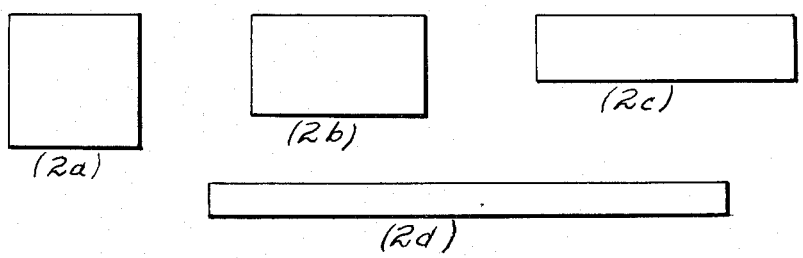
FIGURES 2A through 2D are illustrations of the cross-sectional configurations of various pages of outlet ports in the hull of a vessel.

Referring now to FIGURES 2A, 2B, 2C and 2D, the conventional valve thrusters now in use employ a generally round or square output aperture shape as indicated by the drawing of FIGURE 2A. The jet of this configuration having pressure required to maneuver a 2,000 to 2,500 ton vessel might have a destructive range of approximately one-half mile if directed horizontally out of the hull. By elongating one of the dimensions of the output aperture, for instance the horizontal dimension as illustrated in FIGURE 2B, the surface area available for energy interchange between the jet and the surrounding fluid is increased. The rate of energy exchange is also increased and the destructive range of the jet is reduced. The port, as illustrated in FIGURE 2C, has its energy dissipated more rapidly than that of a jet issued by the port of FIGURE 2B while that of FIGURE 2D disperses the energy still more rapidly. In the apparatus of FIGURE 2D, the loss of energy in the conversion from the generally rectangular passage provided just downstream of the nozzle 16 to the configuration of FIGURE 2D, is not great but the rate of energy dissipation is approximately four times the rate of that of the jet configured in accordance with FIGURE 2A. Thus, the effective corresponding destructive range of the jet issued from the port of FIGURE 2D would be approximately one-eighth of a mile. By inclining the jet downwardly so that it passes under adjacent vessels the danger of destruction to adjacent vessels or installations is materially reduced. Thus, it is preferred to use the port of FIGURE 2D at the locations 27 and 28 of FIGURE 1.

Figure 3:
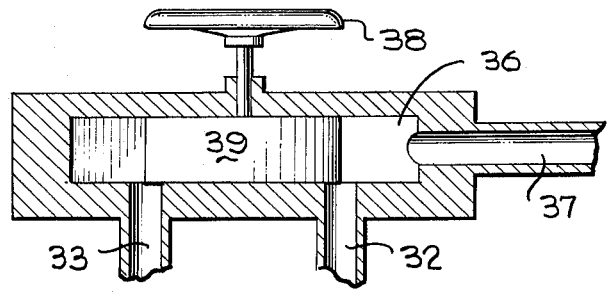
FIGURE 3 is a cross-section in elevation of a first type of controller which may be employed with the present invention.
Figure 4:
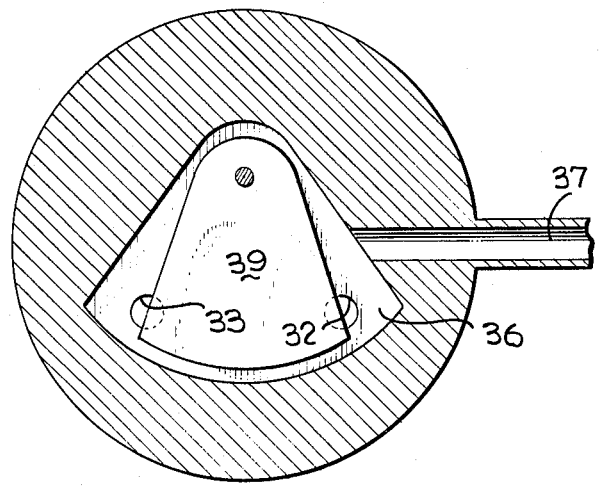
FIGURE 4 is a top view of the controller of FIGURE 3.

Referring now specifically to FIGURES 3 and 4 of the accompanying drawings, there is illustrated one form of the controller 34 which may be employed with the bow thruster system of the present invention. The controller 34 comprises a chamber 36 connected to a source of liquid or air or other gas via a pipe 37. The only requirement concerning the pressure of the fluid in the chamber 36 is that the pressure be above the pressure in the amplifier at the entrance of the control passages 29 and 31. If the velocity of the water through the amplifier's interaction region is sufficiently high, the pressure at control passages 29 and 31 will be below atmospheric pressure and the chamber 36 may be maintained at atmospheric pressure. In other systems, the design of the amplifier will be such that the ambient pressure in the interaction region will be above atmospheric pressure. In such a system, the chamber 36 must be pressurized above atmospheric. In FIGURE 3, passages 32 and 33, which lead to control nozzles 29 and 31, respectively, are illustrated as entering the bottom of the chamber 36. There is provided a control knob 38 having secured thereto a sector-shaped plate 39. The sector plate 39 is of such a size relative to the spacing between the passages 32 and 33, where they enter the bottom of the chamber 36, that the sector when in its home position covers approximately one-half of each of the passages 32 and 33. The "home position" as employed herein refers to the position of the knob 38, and therefore, the sector plate 39, when no resulting thrust is to be developed.

Under the conditions illustrated in FIGURES 3 and 4, the same quantity of pressurized fluid is supplied to the channels 32 and 33 and the fluid issuing from the nozzle 16 of the thruster illustrated in FIGURE 1 divides equally between the passages 22 and 23. When it is desired to produce a net thrust in one direction or the other, the knob 38 is rotated so as to, for instance, increase the coverage of the passage 32 and decrease the coverage of the passage 33. As a result, more and/or higher pressure fluid is delivered to the passage 33 and less and/or lower pressure fluid is delivered to the passage 32 than when the knob is in the home position. A resultant pressure differential is developed across the fluid issuing from the nozzle 16 so that a greater proportion of the fluid is delivered to the output passage 22 than the passage 23 and a net thrust toward the port side of the craft is developed, turning the craft in that direction. Since the device illustrated is an analog device, the quantity of fluid delivered to the output passages 22 and 23 is a function of the degree of rotation of the knob 38. If one of the ports, such as port 22, is completely covered, the other port, such as port 33, is uncovered, and all of the fluid flows to one of the outlet passages, in this example, the passage 22. Under these circumstances, a maximum net thrust is developed toward the port side.

The knob 38 may be biased by a spring arrangement to normally return to the home position upon removal of the operator's hand and the knob may, if desired, be detented in this position.

Figure 5:
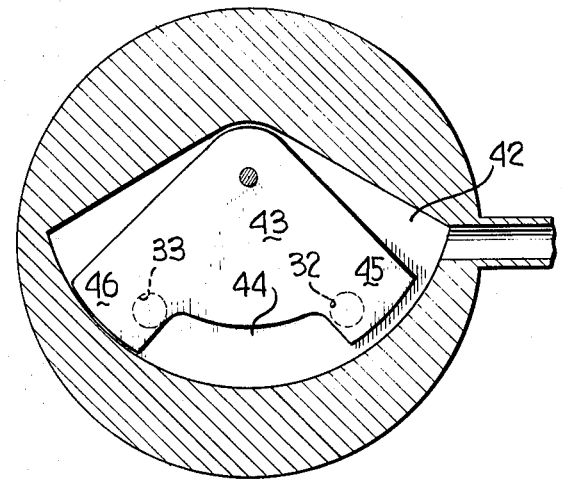
FIGURE 5 is a top view of a second type of controller which may be employed with the apparatus of FIGURE 1.

Referring now specifically to FIGURE 5 of the accompanying drawings, there is illustrated another form of controller having particular applicability to a system in which the chamber is operated above atmospheric pressure. This controller includes a pressurized chamber 42, and a sector plate 43 having a recessed region 44 formed centrally in its circumferential surface. The recessed region defines two projections 45 and 46 which normally cover the passages 32 and 33, respectively. Thus, control fluid is normally not supplied to the control nozzles 29 and 31 of FIGURE 1 when the plate 43 is in the home position; the position illustrated in FIGURE 5. When it is desired to initiate thrust, the plate 43 is rotated and maintains one of the ports covered while uncovering the other port. Thus, one control nozzle receives fluid while the other does not. When one of the passages, such as 32, is completely uncovered as a result of continued rotation of the plate 43, maximum thrust in one direction is developed.

The control system of FIGURES 3 and 4 is equally applicable for use with a pure fluid amplifier of either the analog or digital type whereas the controller of FIGURE 5 is designed primarily for use with an amplifier of the analog type. More particularly, in the analog type of amplifier, the fluid issuing from the nozzle 16 will, without any control, divide equally between the outlet ports such as ports 22 and 23. In a digital type of amplifier the fluid normally issues, due to boundary layer entrainment, to one of the outlet passages to the exclusion of the other. In the system of FIGURES 3 and 4, the necessary entrainment fluid is supplied, when the knob 38 is in its home position, to prevent boundary layer lock-on of the stream to one or the other of the walls 19 and 21. In this instance, a normally boundary layer type of device will operate as an analog system and, in the presence of a differential in flow to the passages 32 and 33, the stream divides in proportion to the input signals between outlet passages. However, if one of the passages is almost completely blocked, then boundary layer effects take hold and the stream is completely deflected. The flow gain of such an amplifier is greater than that available with an analog amplifier in which beam deflection is wholly dependent upon momentum interchange between the main and controlling flows.

The controller of FIGURE 5 is particularly applicable to an analog system since entrainment fluid need not be supplied to maintain the stream undeflected under normal conditions and the controller of FIGURE 5, of course, does not supply fluid to the passages 32 and 33 when the controller is in the home position. The advantage of this type of system is that, even though lower gain is achieved, the source of pressurized fluid does not have to supply a load at all times but only assumes a load when it is desired to produce a thrust vector. A combined analog and digital pure fluid amplifier may also be employed, this being one in which the device is basically analog but employs boundary layer lockon to enhance the gain and which, when full stream deflection is achieved, operates as a digital unit. Such a device is described in the copending patent application Serial No. 325,028 of Francis M. Manion filed on November 20, 1963.

Where the installation is such that the control nozzles 29 and 31 are located at a sufficiently shallow depth; that is, low hydrostatic pressure, and where the velocity of the flow of fluid through the nozzle 16 is sufficiently high, it is possible to utilize the ambient pressure as the pressure supply 37 of the fluid being used to control the amplification system. Under the conditions set forth above, a large suction is developed at the ports 29 and 31 and causes the induction into the system of atmospheric air. The inducted air, in being drawn through the nozzles, supplies fluid between the adjacent sidewall and the main stream issuing from the nozzle 16, thereby lessening the boundary layer effect. The degree of these effects may be controlled by the controller of the type illustrated in FIGURES 3 and 4 or FIGURE 5 to vary the quantity of air introduced through the control nozzle and therefore deflection of the main stream.

Figure 6:
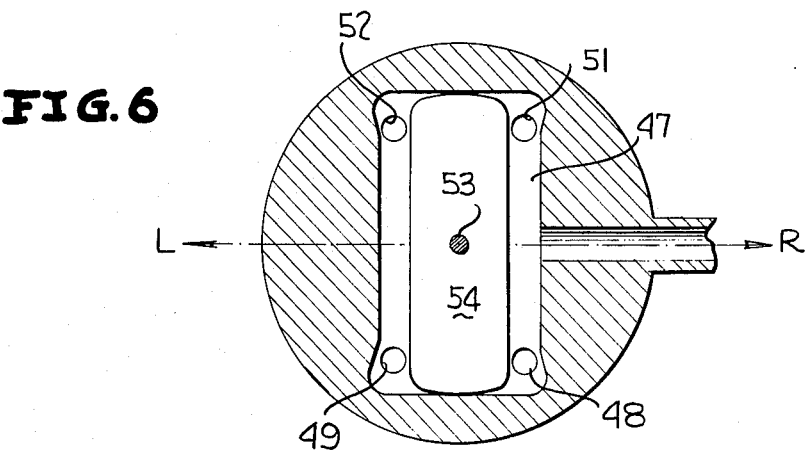
FIGURE 6 is a top view of a controller which may be employed for concurrent control of two thruster mechanisms.

The control system has been illustrated as utilizing an individual control knob 38 for the bow thruster assembly and can be provided with a separate control knob, not illustrated, for the stern thruster assembly in installations where there is both a bow and stern thruster. FIGURE 6 illustrates a second type of remote manual control station in which a single control knob may be employed to provide interrelated control between bow and stern thrusters for effecting sidewise translatory motion or rotational motion for steering. The apparatus includes a pressurized chamber 47 having four egress ports 48, 49, 51 and 52 in one of the walls thereof. The ports 48 and 49 are associated with a bow thruster and ports 51 and 52 are associated with a stern thruster. The controller is provided with a control knob (not illustrated) employed to rotate or translate a shaft 53 which carries a plate 54 adapted to cover and uncover the various ports enumerated above. The ports 49 and 52 are connected to control nozzles of their associated thrusters such that, when fluid is supplied to these two ports, their associated thrusters develop a thrust in the same direction. Thus, if a plate 54 is moved to the right, as viewed in FIGURE 6, to cover the ports 48 and 51, denying pressurized fluid thereto, the flow from the two thrusters is in the same direction and the ship is translated in one direction. Conversely, if the plate 54 is moved so that the ports 49 and 52 are covered, the resultant thrust is in the opposite direction and the vessel translates in the opposite direction. If the shaft 53 is rotated, for instance, clockwise, the ports 49 and 51 are covered and the bow and stern thrusters issue fluid from opposite sides of the vessel to produce a moment about the vertical axis of the ship, thereby resulting in a rotational change of ship motion. Conversely, if the knob 53 is rotated so that the plate covers the ports 48 and 52, a turning moment in the opposite direction is developed and the ship steers in the opposite direction. In this fashion, the operator is provided with an additional flexibility over and above that obtained in an installation where only a forward bow thruster assembly is employed. The utilization of bow and stern thruster assemblies provides both rotational action and a right-left translating action as a result of the forces developed by the thrusters.

Figure 7:
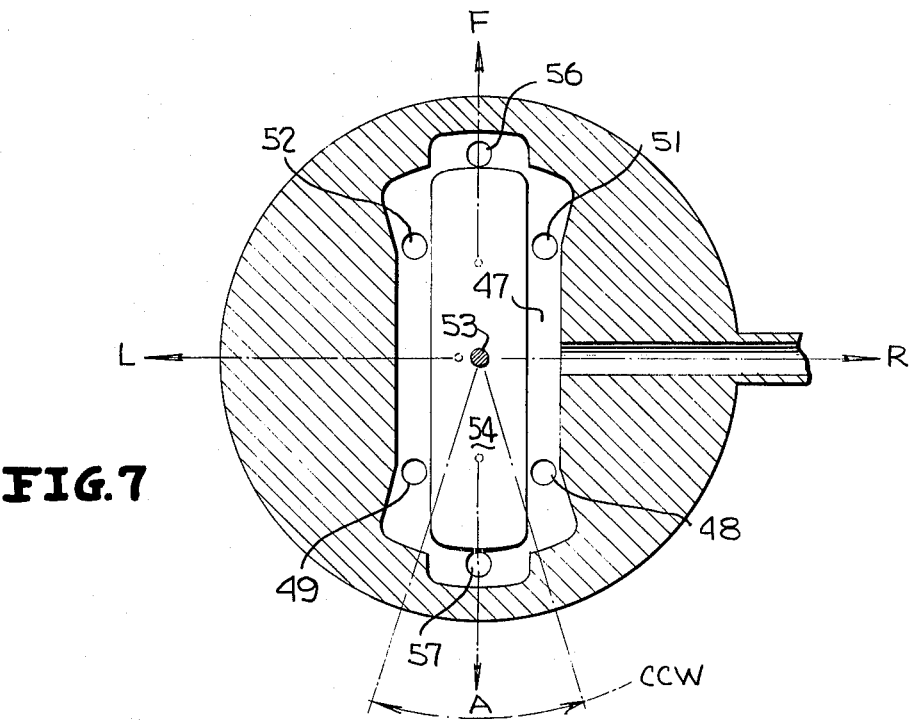
FIGURE 7 is a top view of a controller which may be employed for concurrent control of three thruster mechanisms.

FIGURE 7 illustrates still another embodiment of a control system for controlling the maneuvering of waterborne vessels. The system of FIGURE 7 is in many respects substantially identical with that illustrated in FIGURE 6 except for the addition of one additional control function. The elements of FIGURE 7 which are identical with those in FIGURE 6 bear the same reference numerals as in the prior figure. The controller of FIGURE 7 is intended to be employed with three distinct thrust control devices. The three devices are bow and stern thrusters as previously described and a third thruster which discharges fluid in a fore or aft direction parallel to the major axis of the ship and as such does not introduce a turning moment. The third thruster is employed to produce relatively small thrust in the fore and aft directions for maneuvering in tight spaces.

The control of bow and stern thrusters by the device of FIGURE 7 is the same as for the device of FIGURE 6. In order to control the fore and aft thruster, there is provided a pair of ports 56 and 57 in the pressurized chamber 47. The plate 54 may be translated in an up and down direction, as viewed in FIGURE 7, to cover one or the other of the ports 56 or 57 so as to prevent the flow of control fluid to one of these ports and thus direct a greater or lesser proportion of the fluid inducted into the fore-and-aft thruster to one of the output ports to produce either forward or aft movement of the craft. The plate 54 is of sufficient length and lateral dimension to be able to cover, for instance, ports 49 and 51 and one of the ports 56 or 57. Thus, the ship may be caused to be rotated about its vertical axis and at the same time to move in a given direction to increase the maneuverability of the craft. Such an installation is particularly useful in docking and in control of barges used for oil well drilling at off-shore locations wherein the control system must be able to control both orientation and location of the barge in the horizontal plane.

It is apparent that, in all of these control systems as illustrated in FIGURES 3 through 7, one may if desired use electrical controls to produce effective blocking of the passages leading from the pressurized chamber to the various control nozzles of the thrusters. On the other hand, overriding electrical signals may be employed to control, for instance, the plate 54 of FIGURES 6 and 7 by means of electrically operated solenoids operating against centering springs on the plate. The particular arrangements illustrated are adapted for manual control since this is the simplest form of the apparatus and the provision of means for responding to electrical signals to move the plate 54 or control individual valves in the various passages are well-known in the art.

Figure 8:
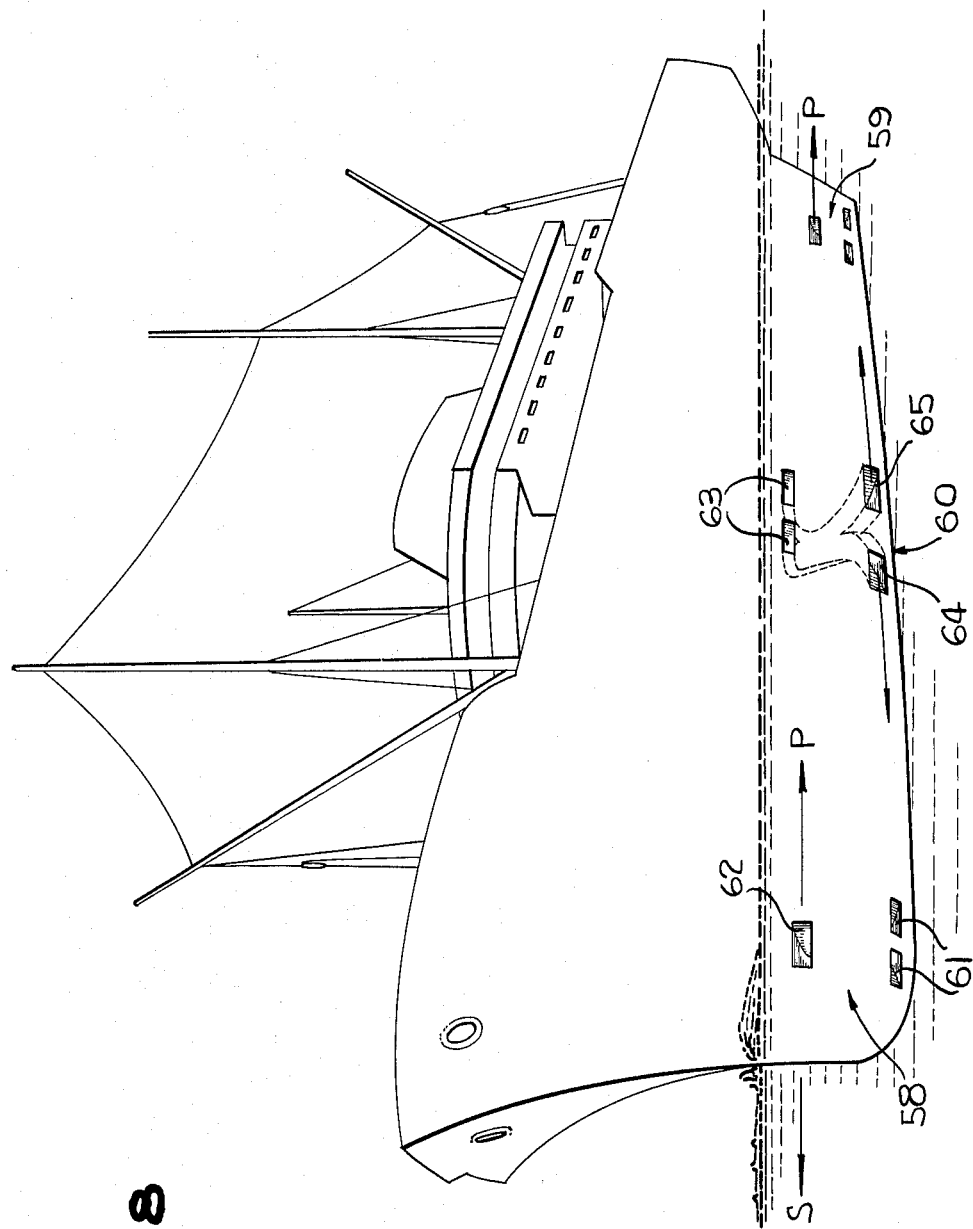
FIGURE 8 is a perspective illustration of a vessel having bow and stern and fore and aft thrusters.

Referring now specifically to FIGURE 8 of the accompanying drawings, there is illustrated a marine craft having three thruster assemblies; a bow thruster 58, a stern thruster 59 and a fore-and-aft thruster 60. The bow thruster 58 has a pair of inlet ports 61 on the near side and a further pair of inlet ports (not visible) on the far side of the vessel. An outlet port 62 emits fluid for producing thrust, a second outlet port being located on the other side of the vessel but not being visible in this figure. The stern thruster 59 is identical with the bow thruster and therefore is not discussed in detail.

The fort-aft thruster 60 is quite similar to the bow and stern thrusters but is upside down with two inlet ports 63 disposed above a fore and an aft outlet port 64 and 65. The outlet ports 64 and 65 are located on one side of the vessel for ease of installation. Fluid issued from port 64 is directed forward and tends to move the vessel towards the stern while fluid issued from port 65 is directed aft and tends to move the vessel forward. The net side thrust may be compensated by a bias built into the thrusters 58 and 59 or two fore-aft thrusters may be employed, one on each side of the vessel.

As has been previously indicated, pure fluid amplifiers controlled by flapper or butterfly valves located in the control passages may be employed in the apparatus of the present invention. For instance, and reference is now made to FIGURE 1, the box 34 which has been employed previously to indicate a manual control may merely represent a source of pressure. The supply to control nozzles 29 and 31 may be effected by placing flapper or butterfly valves in the passages 32 and 33 so as to control the distribution to the output passages 22 and 23. The advantage to such a system over prior art mechanical valve systems is that the flapper or butterfly valves are not at any time subject to the environment in which the system is operating and further, that the flapper valves may be smaller than when located in the various channels of the main thruster since the quantity of fluid that must be controlled in the passages 32 and 33 to effect distribution of the fluid to the passages 22 and 23 is smaller than in the former case. Thus, flapper valves may operate in a relatively clean fluid environment and may be considerably smaller than in the prior art devices.

Further reductions in the size of the flapper valves may be effected by fabricating the thruster as a staged pure fluid amplifier. The staged amplifier may be of the basic type illustrated in FIGURE 1 or may be of the type disclosed and claimed in the co-pending patent application Serial No. 329,439 filed by Francis M. Manion on December 10, 1963 and assigned to the same assignee as the present invention. In this latter type of unit, the flapper valves are located in the main fluid stream but, due to their small size, the expense of making them relatively insensitive to the fluid environment is not excessive.

Figure 9:
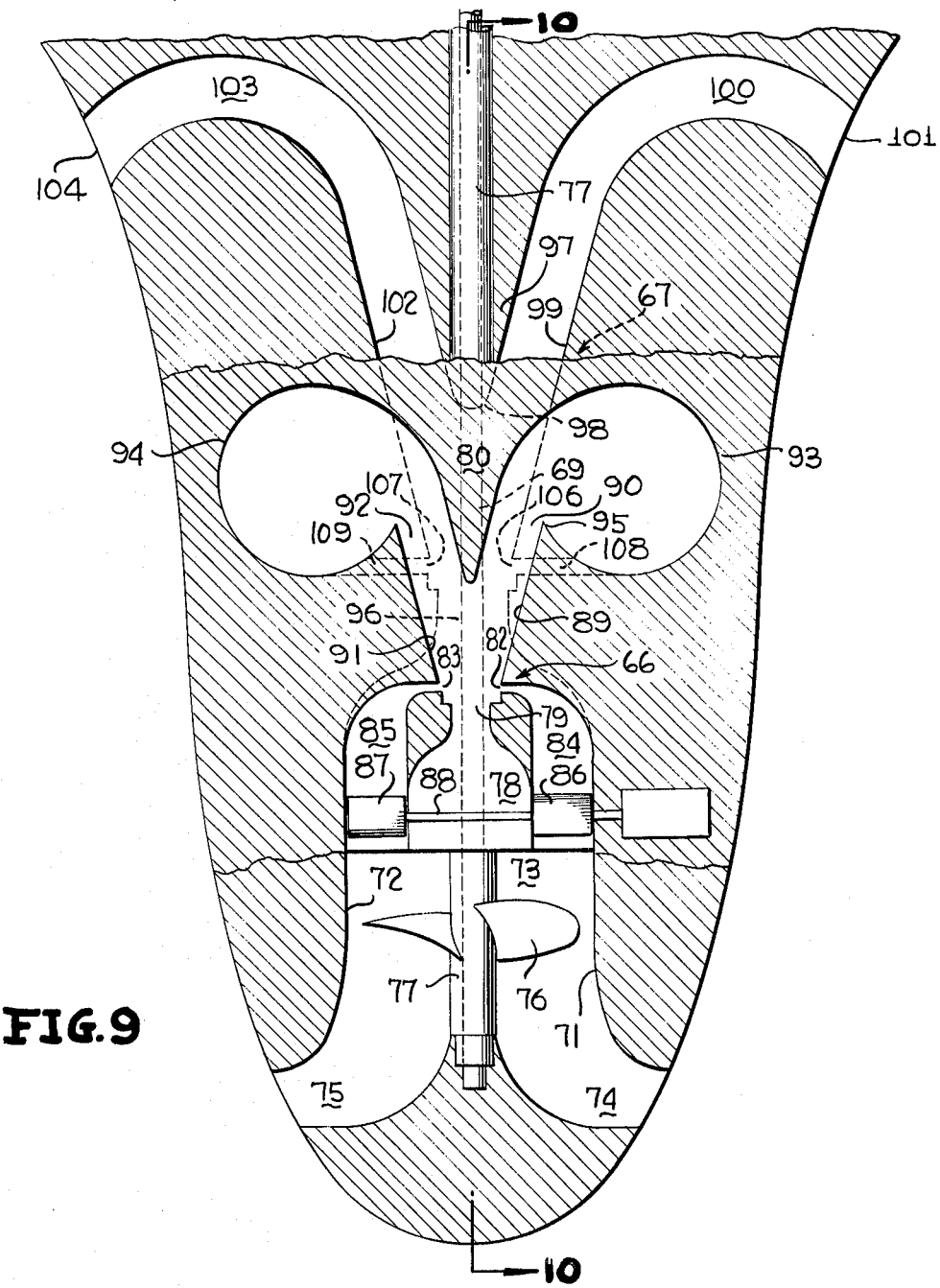
FIGURE 9 is a cross-sectional view in elevation of a second form of thruster mechanism.
Figure 10:
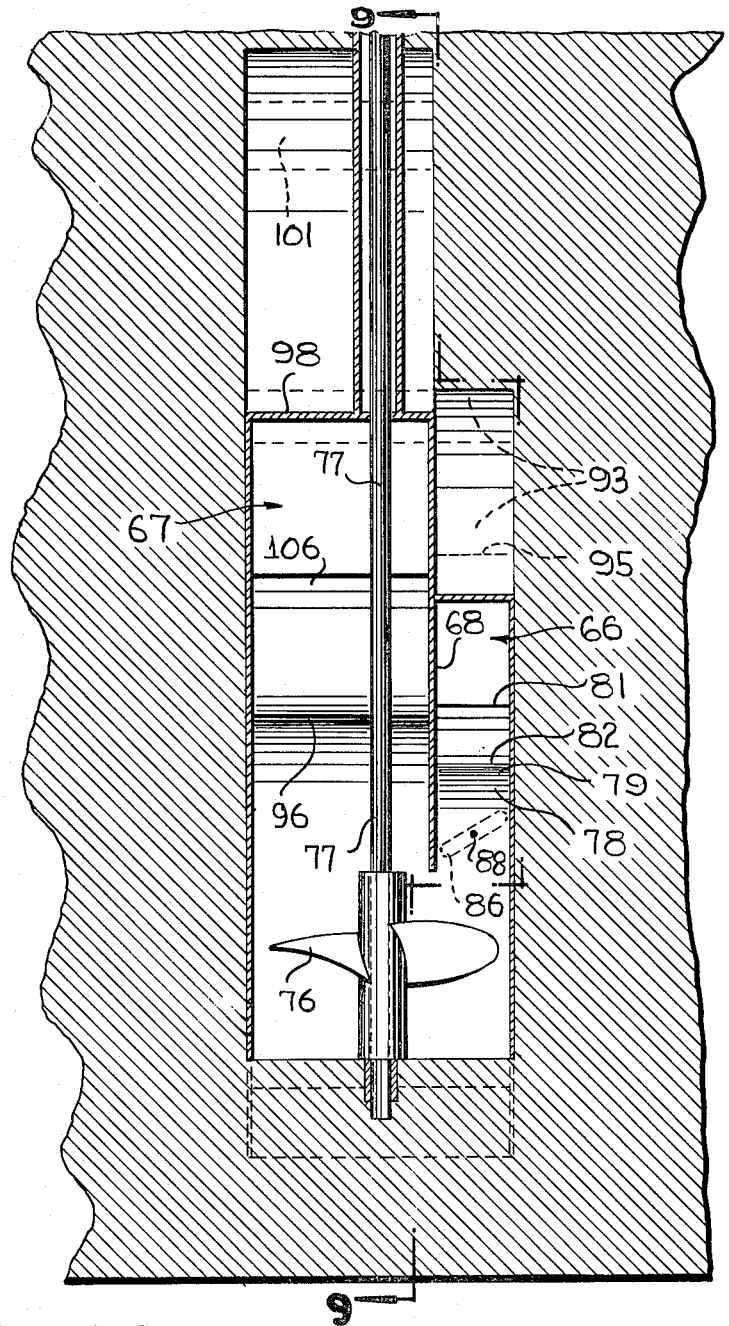
FIGURE 10 is a side view in elevation taken along line 10—10 of FIGURE 9.

Referring specifically to FIGURE 9, a thruster assembly employing the staged amplifier of the aforesaid application is illustrated. The assembly comprises a first pure fluid amplifier generally designated by the reference numeral 66 and a second fluid amplifier generally designated by the reference numeral 67. The amplifiers are staged so that fluid signals developed by the amplifier 66 are applied as control signals to the amplifier 67. The amplifiers 66 and 67 are disposed in parallel planes and are separated, and reference is made now to FIGURE 10, by a plate 68. The amplifier 66 is confined in a space between an interior wall 69 of the vessel and the plate 68. The amplifier 67 is disposed between the plate 68 and an interior wall 70 of the vessel parallel to wall 69. The walls 69 and 70 in conjunction with a further pair of walls 71 and 72, as illustrated in FIGURE 9, define an ingress passage 67 disposed vertically of the vessel. The passage 73 is branched to form passages 74 and 75 which extend out the two sides of the hull of the vessel. In this way, the opening into the unit is not pushed into the mud if the vessel touches bottom. A propeller 76 is disposed below the amplifiers 67 and 68 and is adapted to induct fluid into the system. The propeller 76 is driven by means of the shaft 77, the flow straighteners of FIGURE 1 being eliminated from the present figure for purposes of clarity.

Referring specifically to FIGURE 9, the amplifier 66 includes a main power nozzle 78 terminating in a power nozzle orifice 79. A flow divider 80 is located downstream of the power nozzle orifice 79 and has an apex 81 located along the centerline of the nozzle 79 and directed toward it. A pair of control nozzles 82 and 83 are let in from the starboard and port sides of the device, respectively, to admit control signals thereto. The nozzles 82 and 83 are continuous with passages 84 and 85, respectively, which turn through 90° so that the inlets to the passages 84 and 85 are directed upstream from their associated control nozzles. Located in the passages 84 and 85 are butterfly valves 86 and 87, respectively, the butterfly valves being carried on a single shaft 88. The valves are positioned on the shaft 88 such that, when the shaft is rotated in one direction, one of the passages is increasingly opened while the other passage is increasingly closed. The fluid is issued into the passages 84 and 85 from the propeller 76 and the small portion of the fluid inducted into the amplifier 66 is employed to control the amplifier 66. The divider 80 in conjunction with a sidewall 89 defines a first outlet passage 90 while a sidewall 91 in conjunction with the divider 80 defines an outlet passage 92. The passage 90 terminates in a generally circular chamber 93 while the passage 92 terminates in a generally circular chamber 94. The chambers 93 and 94 constitute vortex transfer units and may be of the type described in the co-pending patent application Serial No. 325,029 of Francis M. Manion filed on November 20, 1963, and assigned to the same assignee as the present invention. For the purpose of locating elements in FIGURE 10 which correspond with those in FIGURE 9, the intersection of the passage 90 and the chamber 93 provides a cusp 95 which is also numbered in FIGURE 10.

The fluid amplifier 67 comprises a power nozzle 96 and a divider 97 having an apex 98 located along the centerline of the nozzle 96 and directed toward the nozzle. The amplifier 67 is provided with a first sidewall 99 which, in conjunction with the divider 97, provides a first outlet passage 100 which passes through the hull of the vessel at a port 101. A second sidewall 102 of the amplifier 67 defines, in conjunction with the divider 97, a second outlet passage 103 passing through the hull of the vessel at a port 104.

The amplifier 67 is provided with a first control nozzle 106 and a second control nozzle 107. The nozzle 106 is connected via a passage 108 to the vortex chamber 93 so as to receive fluid therefrom while the nozzle 107 is connected via a passage 109 to the vortex chamber 94 to receive fluid from this chamber.

In operation, the shaft 77 is rotated to establish fluid flow to both amplifiers 66 and 67. The butterfly valves are adjusted by shaft 88 to establish a predetermined relationship between the fluids issuing from the control nozzles 82 and 83 of the first stage amplifier 66. The signals developed by the amplifier are applied through the vortex transfer chambers 93 and 94 to the control nozzles 106 and 107 of the second stage fluid amplifier 67. The signals thus produced at the control nozzles 106 and 107 determine the relative proportions of fluid directed to the vectoring or thrust outlet passages 100 and 103 to control the net thrust developed by the apparatus. Both of the amplifiers 66 and 67 have gain; that is, the fluid signals applied thereto are somewhat less than the fluid signals developed in their output channels. Since two stages of amplification are employed, the relative size of the flapper valves 86 and 87 in control passages 84 and 85 may be small relative to the size of butterfly or flapper valves employed in prior art valve thrusters where such valves were required to control the main flow of the system. In the particular embodiment of the invention illustrated, the butterfly valves would normally be about one-fifth of the size of the butterfly valves disposed in outlet passages 100 and 103 of a conventional valve thruster.

It is apparent that multi-stage fluid amplifiers may be employed; that is, amplifiers of three or four stages if such is desired. If a three stage amplifier is employed, then the size of the butterfly valves 84 and 85 would only have to be about one-eleventh of the size of the butterfly valves employed to control the main stream flow.

It will be noted that all of the fluid diverted to the first stage amplifier 66 is ultimately recombined with the main flow through the amplifier stage 67 so that none of the fluid is lost to the system and a constant mass flow is obtained.

Control of the shaft 88 may be effected in numerous well-known ways to achieve a desired steering function. A relatively small, remotely controlled electric motor or other electro-mechanical transducer may be employed. Alternatively, a pneumatic or hydraulic follow-up system having the controls at the bridge of the vessel may also be employed for such a purpose.

It is of interest to note that the upper end thrust bearing of the shaft 77 may be located above the water line so that only the side thrust bearings must operate in a water environment. This, of course, increases the life of the bearing and simplifies its structure since a water seal is not required in conjunction therewith. It should also be noted that the basic staged amplifier arrangement of FIGURES 9 and 10 may be employed with fluid input signals by bringing the passages 84 and 85 out through the sidewalls 71 and 72 and controlling flow thereto. Control may be by mechanical valves as valves 86 and 87 or by a controller which may be one of the types illustrated in FIGURES 3–7. If air is used to control the amplifier 66 some changes in the shape and size of the interaction region might be required in some installations where very high water flow rates are required to effect thrust.

While I have described and illustrated several specific embodiments of my invention, it will be clear that variations of the details of construction which are specifically illustrated and described may be resorted to without departing from the true spirit and scope of the invention as defined in the appended claims.

What I claim is:

1. A force generator system for water-borne craft having a hull, said system comprising an opening in said hull, a passage communicating with said opening, a propeller located in said passage for inducting water into said passage through said opening in said hull, a pure fluid amplifier having a power nozzle, at least one control nozzle, and two output passages positioned to receive water issued by said power nozzle, two ports in said hull, said ports adapted to issue water in generally opposite directions, each of said ports being in flow communication with a different one of said output passages, said power nozzle receiving water under pressure from said passage and means for controlling flow of fluid in said control nozzle to effect deflection of said power stream so as to control the proportioning of said stream between said output passages said outlet passages being depressed at an angle relative to the horizontal so as to issue water through said ports at an angle of between five and ten degrees below the horizontal of said craft.

2. The combination according to claim 1 wherein said ports are rectangles having their major dimensions considerably larger than their minor dimensions and lying parallel to the horizontal of the craft.

3. A force generator for water-borne craft having a hull, comprising an opening in said hull, a passage communicating with said opening, a propeller located in said passage for inducting water into said passage through the opening in said hull, a pure fluid amplifier having two output passages, an interaction region, a power nozzle for issuing water through said interaction region toward said output passages, and two control passages disposed on opposite sides of said power nozzle, two further openings in said hull, said openings adapted to issue water in generally opposite directions, each of said openings being in flow communication with a different one of said output passages, said power nozzle receiving water under pressure from said passage, means for controlling flow of fluid in said control passages to control deflection of said power stream, and a rotatable shaft for rotating said propeller, said shaft extending through said interaction region and said power nozzle to said propeller.

4. The combination according to claim 3 further comprising a source of fluid, a pair of fluid conduits each extending between said source of fluid and a different one of said control passages, and a controller for differentially varying flow of fluid from said source to said fluid conduits.

5. A force generator for water-borne craft having a hull, comprising an opening in said hull, a passage communicating with said opening, a propeller located in said passage for inducting water into said passage through the opening in said hull, a pure fluid amplifier having two output passages, an interaction region, a power nozzle for issuing water through said interaction region toward said output passages, and two control passages disposed on opposite sides of said power nozzle, two further openings in said hull, said openings adapted to issue water in generally opposite directions, each of said openings being in flow communication with a different one of said output passages, said power nozzle receiving water under pressure from said passage, means for controlling flow of fluid in said control passages to control deflection of said power stream, a rotatable shaft for rotating said propeller, said shaft extending through said interaction region and said power nozzle to said propeller, a second fluid amplifier having a power nozzle, an interaction region, a second pair of control passages and two outlet passages, said power nozzle receiving fluid from said propeller, and each of said second pair of outlet passages supplying fluid to a different one of said control passages of said first-mentioned fluid amplifier.

6. The combination according to claim 5 further comprising a pair of flapper valves each located in a different one of said second pair of control passages and means for moving said flapper valves so as to differentially vary fluid flow through said second pair of control passages, said second pair of control passages being positioned to receive water from said propeller.

7. The combination according to claim 5 wherein said fluid amplifiers are arranged side-by-side downstream of said propeller.

8. The combination according to claim 7 wherein said fluid amplifiers further include sidewalls defining said interaction regions, said sidewalls being located such as to produce boundary layer enhancement of control signals introduced through said control passages.

9. A force vectoring system for a water borne craft having a hull comprising a bow thruster and a stern thruster, each of said thrusters including an opening in said hull, a passage communicating with said opening, a propeller located in said passage for inducting water into said passage through said opening in said hull, a pure fluid amplifier having a power nozzle, at least one control nozzle, and two output passages positioned to receive water issued by said power nozzle, two further openings in said hull, said openings adapted to issue water in generally opposite directions and each of said openings being in flow communication with a different one of said output passages, said power nozzle receiving water under pressure from said passage, and a unitary means for controlling flow of fluid in said control nozzles of both said thrusters to control deflection of their associated power streams.

10. A force vectoring system for a water-borne craft having a hull comprising a bow thruster and a stern thruster, each of said thrusters including an opening in said hull, a passage communicating with said opening, a propeller located in said passage for inducting water into said passage through said opening in said hull, a pure fluid amplifier having a power nozzle, control nozzles, and two output passages positioned to receive water issued by said power nozzle, two further openings in said hull, said openings adapted to issue water in generally opposite directions and each of said openings being in flow communication with a different one of said output passages, and said power nozzle receiving water under pressure from said passage; a unitary means for controlling flow of fluid in said control nozzle of both said thrusters to control deflection of their associated power streams; said unitary means including a chamber, four channels each extending between said chamber and a different one of said control nozzles and means for controlling supply of fluid in variable quantities to any combination of two and four of said channels.

11. A force vectoring system for a water-borne craft having a hull, said force vectoring system comprising a bow thruster, a stern thruster and a fore-and-aft thruster, each of said thrusters including an opening in said hull, a passage communicating with said opening, a propeller located in said passage for inducting water into said passage through said opening in said hull, a pure fluid amplifier having a power nozzle, at least two control nozzles, and two output passages positioned to receive water issued by said power nozzle, two further openings in said hull, said openings adapted to issue water in generally opposite directions and each of said openings being in flow communication with a different one of said output passages, and said power nozzle receiving water under pressure from said passage; a unitary means for controlling flow of fluid in said control nozzle of both said thrusters to control deflection of their associated power streams, said unitary means comprising a chamber, six channels each extending from said chamber to a different one of said control nozzles, and means for controlling fluid flow through said channels in various combinations of one, two and four of said channels.

12. The combination according to claim 2 wherein the ratio of the major dimensions to minor dimensions of said ports is such that the rate of dissipation of energy of the fluid issued through said port is approximately four times as great as for a square port capable of handling the same quantity of fluid at the same pressure.

13. A force generator system for water-borne craft having a hull, said system comprising an opening in said hull, a passage communicating with said opening, a propeller located in said passage for inducting water into said passage through said opening in said hull, a pure fluid amplifier having a power nozzle, at least one control nozzle, and two output passages positioned to receive water issued by said power nozzle, two further openings in said hull, said openings adapted to issue water in generally opposite directions, each of said openings being in flow communication with a different one of said output passages, said power nozzle receiving water under pressure from said passage and means for controlling flow of fluid in said control nozzle to effect deflection of said power stream so as to control the proportioning of said stream between said output passages, said outlet passages being depressed at an angle relative to the horizontal so as to issue fluid at a depressed angle relative to the horizontal of at least five degrees.

14. A force generator system for water-borne craft having a hull, said system comprising an opening adjacent the bottom of said hull, and upwardly extending passage communicating with said opening in said hull, a propeller located in said passage for inducting water into said passage through said opening, a pure fluid amplifier having a power nozzle disposed above and in communication with said passage, at least two fluid output passages disposed above said power nozzle and positioned to receive water issued by said power nozzle and fluid control means for varying the quantity of fluid received by each of said output passages, and two ports in said hull adapted to issue water in generally opposite directions each of said ports being in flow communication with a different one of said output passages, said ports having major dimensions considerably larger than the minor dimensions thereof.

References Cited by the Examiner

UNITED STATES PATENTS

| | | | |
|---|---|---|---|
| 717,356 | 12/1902 | Cunningham | 115—16 X |
| 943,604 | 12/1909 | Montjustin | 115—16 X |
| 1,240,932 | 9/1917 | Brown et al. | 114—151 |
| 1,726,962 | 9/1929 | May | 115—16 |
| 2,330,674 | 9/1943 | Briggs | 114—151 |
| 2,884,889 | 5/1959 | Jorg et al. | 115—14 |
| 3,091,393 | 5/1963 | Sparrow | 137—81.5 |
| 3,122,165 | 2/1964 | Horton | 244—78 X |
| 3,127,865 | 4/1964 | Pleuger | 114—151 |

MILTON BUCHLER, *Primary Examiner.*

ANDREW H. FARRELL, *Examiner.*